Patented June 24, 1930

1,765,666

UNITED STATES PATENT OFFICE

WILFRIED GENTH, OF COLOGNE-STAMMHEIM, GERMANY, ASSIGNOR TO I. G. FARBEN-INDUSTRIE AKTIENGESELLSCHAFT, OF FRANKFORT-ON-THE-MAIN, GERMANY, A CORPORATION OF GERMANY

MANUFACTURE OF HOLLOW BODIES CONSISTING OF VULCANIZED RUBBER

No Drawing. Application filed March 14, 1929, Serial No. 347,179, and in Germany March 21, 1928.

The present invention concerns an improvement in the manufacture of hollow bodies (balls, squirts, douches, sponges or the like) consisting of vulcanized rubber.

For the manufacture of such hollow bodies it has hitherto been customary to use liquid aerating or inflating agents or solutions or mixtures of ammonium chloride and sodium nitrite in a compressed form (see for instance U. S. Patent 1,415,437.) The latter method represents a great advance over the liquid aerating or inflating agents, since the definite quantity present in the compressed agents enables a higher speed of working without endangering the certainty of the results.

An obvious disadvantage of all these methods, however, consists in the poor stability of the compounds used and the action of the aerating or inflating agents on the rubber mixture. The principal disadvantage of the compressed nitrite is the poor capacity for storage and the necessity of introducing small quantities of water simultaneously with the compressed nitrite into the respective hollow body. All these disadvantages are avoided by the use of metaldehyde. It suffices to employ metaldehyde, compressed into the desired shape, (for example, about 0,5—1 gram for balls of 10 cms. diameter), to produce an internal pressure, sufficient to press the rubber mixture to the walls of the mold.

Also sponge like objects consisting of vulcanized rubber can easily be manufactured with the use of metaldehyde, by adding the latter in a suitable amount (for instance about 5%) to the rubber-vulcanization mixture by rolling or the like and vulcanizing the mixture thus obtained in a suitable mold according to known methods.

I claim:

1. Improvement in the manufacture of hollow articles and sponge like objects consisting of vulcanized rubber, comprising the use of metaldehyde as aerating or inflating agent.

2. Improvement in the manufacture of hollow articles consisting of vulcanized rubber, comprising the use of metaldehyde as aerating or inflating agent in an amount of about 0,5—1 gram calculated upon the formation of balls of 10 cms. diameter.

In testimony whereof I have hereunto set my hand.

WILFRIED GENTH.